(12) United States Patent
Lai

(10) Patent No.: US 10,023,073 B2
(45) Date of Patent: Jul. 17, 2018

(54) FOUR MOTOR DIRECT DRIVING SYSTEM

(71) Applicant: THUNDER POWER NEW ENERGY VEHICLE DEVELOPMENT COMPANY LIMITED, Central (HK)

(72) Inventor: Sheng-Fu Lai, Taoyuan (TW)

(73) Assignee: THUNDER POWER NEW ENERGY VEHICLE DEVELOPMENT COMPANY LIMITED, Central (HK)

( * ) Notice: Subject to any disclaimer, the term of this patent is extended or adjusted under 35 U.S.C. 154(b) by 0 days.

(21) Appl. No.: 14/967,394

(22) Filed: Dec. 14, 2015

(65) Prior Publication Data

US 2017/0113572 A1  Apr. 27, 2017

Related U.S. Application Data

(63) Continuation of application No. 14/923,432, filed on Oct. 27, 2015, now Pat. No. 9,809,129.

(51) Int. Cl.
*B60L 15/20* (2006.01)
*B60K 1/02* (2006.01)
(Continued)

(52) U.S. Cl.
CPC .......... *B60L 15/2036* (2013.01); *B60K 1/02* (2013.01); *B60K 7/0007* (2013.01); *B60L 11/1803* (2013.01); *B60L 11/1805* (2013.01); *B60L 15/38* (2013.01); *B60K 2007/0092* (2013.01); *B60L 2210/40* (2013.01); *B60L 2220/42* (2013.01); *B60L 2220/46* (2013.01);
(Continued)

(58) Field of Classification Search
CPC ............ B60L 15/2036; B60L 2220/42; B60L 11/1803; B60L 11/1805; B60L 15/38; B60L 2210/40; B60L 2220/46; B60L 2240/14; B60L 2240/24; B60L 2240/421; B60L 2260/28; B60K 1/02; B60K 7/0007; B60K 2007/0092; Y02T 10/7258
See application file for complete search history.

(56) References Cited

U.S. PATENT DOCUMENTS 5,465,806 A * 11/1995 Higasa ................ B60K 7/0007
                                                                                   180/165
5,472,059 A * 12/1995 Schlosser ............ B60K 7/0007
                                                                                   180/65.51
(Continued)

FOREIGN PATENT DOCUMENTS

EP    2 450 220 A1   5/2012

OTHER PUBLICATIONS

European Search Report for EP 16193478.1 dated Dec. 19, 2016, 8 pages.
(Continued)

*Primary Examiner* — Courtney D Heinle
(74) *Attorney, Agent, or Firm* — Kilpatrick Townsend & Stockton LLP

(57) ABSTRACT

A driving system for electric vehicles. The driving system may have two or more electric motors, each with voltage inputs, which are connected to the axles and tires of the vehicle. A variable input control may provide a signal that indicates its current operation position to a vehicle control unit. The vehicle control unit takes the information from the variable input control and determines how much power to send to each of the electric motors' voltage inputs.

18 Claims, 11 Drawing Sheets

(51) Int. Cl.
*B60K 7/00* (2006.01)
*B60L 11/18* (2006.01)
*B60L 15/38* (2006.01)

(52) U.S. Cl.
CPC ....... *B60L 2240/14* (2013.01); *B60L 2240/24* (2013.01); *B60L 2240/421* (2013.01); *B60L 2260/28* (2013.01); *Y02T 10/7258* (2013.01)

(56) References Cited

U.S. PATENT DOCUMENTS

| | | | | |
|---|---|---|---|---|
| 5,508,924 A * | 4/1996 | Yamashita | ........... | B60K 7/0007 180/197 |
| 5,573,312 A | 11/1996 | Meuller et al. | | |
| 5,685,798 A * | 11/1997 | Lutz | ........... | B60K 1/02 180/65.51 |
| 5,758,014 A * | 5/1998 | Young | ........... | B60L 3/10 318/434 |
| 6,328,123 B1 * | 12/2001 | Niemann | ........... | B60K 7/0007 180/65.51 |
| 7,178,617 B2 | 2/2007 | Morisawa et al. | | |
| 7,314,424 B2 | 1/2008 | Supina et al. | | |
| 7,451,034 B2 | 11/2008 | Deur et al. | | |
| 7,739,005 B1 * | 6/2010 | Tang | ........... | B60L 3/10 701/22 |
| 7,940,016 B2 | 5/2011 | Donnelly et al. | | |
| 8,453,770 B2 | 6/2013 | Tang | | |
| 8,849,537 B2 | 9/2014 | Yoon | | |
| 2004/0176899 A1 | 9/2004 | Hallowell | | |
| 2005/0148421 A1 * | 7/2005 | Keuth | ........... | B60K 1/02 475/8 |
| 2009/0107749 A1 * | 4/2009 | Clark | ........... | B60K 28/16 180/197 |
| 2009/0260901 A1 * | 10/2009 | Ishii | ........... | A01D 34/78 180/6.5 |
| 2011/0307129 A1 * | 12/2011 | Yu | ........... | B60K 7/0007 701/22 |
| 2012/0046846 A1 * | 2/2012 | Dollens | ........... | B60K 7/0007 701/99 |
| 2012/0159916 A1 * | 6/2012 | Ishii | ........... | A01D 34/64 56/10.2 A |
| 2012/0235617 A1 | 9/2012 | Singh | | |
| 2013/0103244 A1 * | 4/2013 | Ichinose | ........... | B60L 3/06 701/22 |
| 2013/0173100 A1 * | 7/2013 | Takagi | ........... | G05D 17/02 701/22 |
| 2013/0345916 A1 * | 12/2013 | Ozaki | ........... | B60K 17/046 701/22 |
| 2013/0345918 A1 * | 12/2013 | Ozaki | ........... | H02K 7/116 701/22 |
| 2014/0046568 A1 * | 2/2014 | Kato | ........... | B60L 9/18 701/84 |
| 2014/0182954 A1 * | 7/2014 | Weber | ........... | B60K 17/16 180/65.7 |
| 2014/0232175 A1 * | 8/2014 | Yamamoto | ........... | B60K 17/046 301/6.5 |
| 2014/0372026 A1 * | 12/2014 | Georgy | ........... | G01S 19/47 701/469 |
| 2015/0012158 A1 * | 1/2015 | Makino | ........... | B60K 7/0007 701/22 |
| 2015/0112531 A1 * | 4/2015 | Nakajima | ........... | B60L 11/1803 701/22 |
| 2015/0352978 A1 * | 12/2015 | Hashizaka | ........... | B60L 15/2036 701/22 |
| 2017/0113569 A1 | 4/2017 | Lai | | |
| 2018/0029499 A1 | 2/2018 | Lai | | |

OTHER PUBLICATIONS

U.S. Appl. No. 14/923,432, filed Oct. 27, 2015, Non-Final Rejection dated Jan. 13, 2017, all pages.

* cited by examiner

FOUR MOTOR DIRECT DRIVING SYSTEM

RELATED APPLICATION

The present application is a continuation of Non-Provisional U.S. application Ser. No. 14/923,432, filed Oct. 27, 2015, the disclosure of which is hereby incorporated by reference in its entirety for all purposes.

BACKGROUND

Electric vehicles are becoming an increasingly viable alternative to traditional vehicles with internal combustion engines. Electric vehicles have the advantages of compactness, simplicity of design, and being potentially more environmentally friendly, depending on the method by which the electricity used in the electric vehicle was originally generated. The prospect of using renewable energy sources to power automobiles in place of gasoline has obvious advantages as oil reserves across the globe become increasingly depleted.

Manufacturers of electric vehicles and/or hybrid vehicles generally take one of two approaches in configuring an electric motor into a vehicle. The first approach is to place the electric motor in the vehicle in either parallel with the internal combustion engine or in place of the internal combustion engine, thus utilizing the existing structure of the transmission system and gear box to deliver power to the axles and wheels. The second approach is to place the electric motor directly in the internal cavity of the wheel. In-wheel motors have the advantage of being highly simple and compact. The disadvantages of such a system are that the extra weight placed within the wheel increases the unsprung mass of the vehicle which adversely affects the vehicle's ride and handling.

SUMMARY

Exemplary embodiments of the present disclosure may address at least some of the above-noted problems. For example, some embodiments of the present disclosure overcome the limitations of current electric vehicles by eliminating the need for either a transmission or a gear box system. In one aspect, the present disclosure relates to a driving system. The driving system may have two or more electric motors, each with voltage inputs, which are connected to the axles and tires of the vehicle. A variable input control may provide a signal that indicates its current operational position to a vehicle control unit. The vehicle control unit takes the information from the variable input control and determines how much power to send to each of the electric motors' voltage inputs.

In some examples, the driving system may comprise inverters that transform a DC voltage into an AC voltage. Inverters may receive the output signals of the vehicle control unit and modify the voltage before it enters the electric motors. Encoders may be placed near or on the electric motors. Encoders record the mechanical outputs of the electric motors and send the information to the vehicle control unit. Examples of the variable input control may include accelerator pedals, brake pedals, and steering wheels.

In some examples, differential transmission can be facilitated by the vehicle control unit. For example, the vehicle control unit may be configured to distribute uneven voltages to different electric motors so that tires connected to the electric motors may rotate at different speeds. The electric motors can be separate and distinct from the connected wheels.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention claimed. The detailed description and the specific examples, however, indicate only preferred embodiments of the invention. Various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced. In the drawings.

Figure 1:
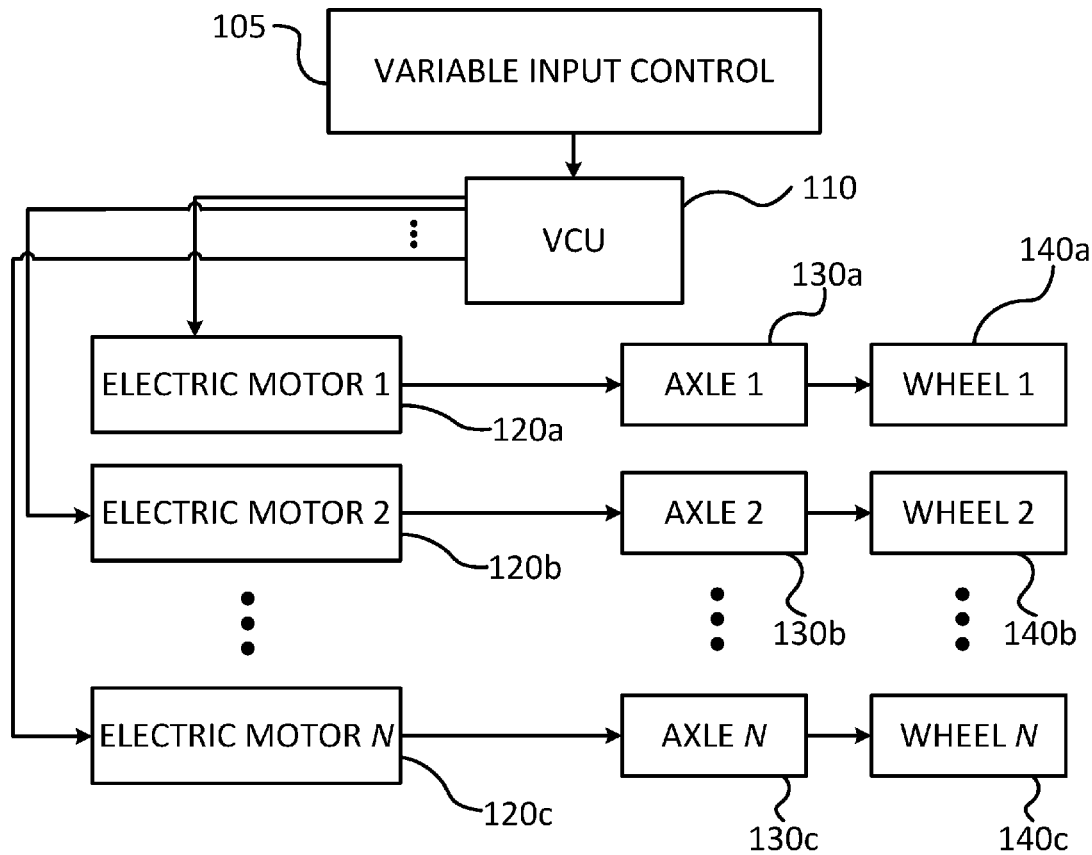
FIG. 1 shows a system diagram of an exemplary embodiment of a driving system.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Various example embodiments of the present disclosure will be described below with reference to the drawings constituting a part of the description. It should be understood that, although terms representing directions are used in the present disclosure, such as "front", "rear", "upper", "lower", "left", "right", and the like, for describing various exemplary structural parts and elements of the present disclosure, these terms are used herein only for the purpose of convenience of explanation and are determined based on the exemplary orientations shown in the drawings. Since the embodiments disclosed by the present disclosure can be arranged according to different directions, these terms representing directions are merely used for illustration and should not be regarded as limiting. Wherever possible, the same or similar reference marks used in the present disclosure refer to the same components.

Unless defined otherwise, all technical terms used herein have the same meanings as commonly understood by one of ordinary skill in the art to which the invention pertains. The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals reference similar parts throughout the several views of the drawings.

Some embodiments of the present disclosure comprise a vehicle driving system consisting of electric motors attached directly to a vehicle's wheels through independent axles. Embodiments of the present invention overcome the limitations of current electric vehicles by eliminating the need for a transmission/gear box system. Embodiments of the present invention further overcome limitations of current electric vehicles by not using in-wheel electric motors. By configuring the electric motors away from the wheel hubs, the unsprung mass of the vehicle is reduced which improves the vehicle's ride and handling. The power delivered to each electric motor is determined by the vehicle control unit, which analyses information gathered from the accelerator pedal, brake pedal, steering wheel, and encoders, and distributes power.

FIG. 1 shows a driving system 100, which is an exemplary embodiment of the present disclosure. In driving system 100, variable input control 105 provides information to vehicle control unit 110 about its operational position. In some embodiments, variable input control 105 may be an accelerator pedal, a brake pedal, or a steering wheel. In some embodiments, the operational position of variable input control 105 is its current status. For example, the operational position of the brake pedal may be "50% pressed" or "100% pressed". Additionally, the operational position of the steering wheel may be "0 degrees turned", "positive 15 degrees turned", or "negative 15 degrees turned".

Vehicle control unit 110 takes the information about the operational position of variable input control 105 and makes a determination as to how much power/voltage to distribute to electric motors 120, from electric motor 1 up to electric motor N, where N is the total number of electric motors. The N electric motors 120 subsequently provide rotational power to axles 130, from axle 1 up to axle N, which then rotate wheels 140, from wheel 1 up to wheel N. The number of electric motors, axles, and wheels (N) may be as small as 1, and does not have an upper-bound limit.

In some embodiments, vehicle control unit 110 makes the determination as to how much power to distribute to electric motors 120 solely based on the information given by variable input control 105. For example, in some embodiments, vehicle control unit 110 may receive a signal from variable input control 105 that the accelerator is "100% pressed" and determine that maximum power/voltage should be allotted to electric motors 120 equally. As another example, vehicle control unit 110 may receive a signal from variable input control 105 that the brake pedal is "100% pressed" and determine that zero power/voltage should be sent to electric motors 120.

In some embodiments, vehicle control unit 110 may be configured to facilitate uneven distribution of power to different motors. This may achieve something similar to the electrical equivalent of a mechanical automobile differential, allowing different wheels to rotate at different speeds during turns. For example, where a vehicle has four wheels (N=4), during a right or left turn, all four wheels will generally be traveling at a different speed. Inside turning wheels (those on the same side of the vehicle as the direction the vehicle is turning) travel at a slower speed than outside turning wheels (those on the opposite side of the vehicle as the direction the vehicle is turning) because of the smaller distance they need to travel. Similarly, rear wheels travel at a slower speed than front wheels that are situated on the same side of the car.

In some embodiments, vehicle control unit 110 can be configured to perform calculations based on the steering angle, the signal from the accelerator pedal, and the width of the vehicle to distribute power in an efficient manner amongst electric motors 120. In some embodiments, vehicle control unit 110 may have the processing means to compute the power levels needed for each electric motor using the theoretical formula for wheel speed. In some embodiments, vehicle control unit 110 may use a lookup table to determine the required power levels where the vehicle width and other parameters are known. The lookup table may be two-dimensional, with the first input variable being the signal from the accelerator pedal and the second input variable being the current steering angle. In some embodiments, the lookup table may be one-dimensional and the signal from the accelerator pedal may be ignored. For example, the lookup table may have a single input variable being the current steering angle. The values of the lookup table may be ratios between the amounts of power to be distributed between different electric motors. The power levels distributed to each electric motor may be a ratio multiplied by the maximum power available or by some total power output.

In some embodiments, the number of electric motors, axles, and wheels may be equal to two (N=2). For example, the system of FIG. 1 may be implemented in scooters, electric bicycles, and other two-wheeled vehicles. In some embodiments, variable input control 105 for a scooter may be a handle accelerator, which may contain a position sensor or an angle sensor that gives information to vehicle control unit 110 regarding the desired speed. Variable input control 105 may also be a footbrake, handle brake, or a steering angle. Vehicle control unit 110 may also gather information about the leaning angle of the scooter with respect to the vertical axis. For a scooter and other two-wheeled vehicles, the determination of how much power to distribute to the different electric motors is generally a simpler calculation than the four wheel implementation. Where a scooter is leaning significantly into a turn, there may be very little variation between the speeds of the front wheel and the back wheel, and therefore vehicle control unit 110 may distribute essentially identical amounts of power to both wheels. Where a scooter is turning and the leaning angle is small, i.e., the scooter is not leaning significantly into the turn, the variation between the speeds of the front wheel and the back wheel may be more significant, and may lend to similar calculations that are made with a four motor implementation.

In some embodiments, the system of FIG. 1 may be implemented in two-wheeled vehicles such as a Segway™, where the wheels are arranged in a side-to-side configuration rather than a front and back configuration. Variable input control 105 may be the weight placement of the user and whether the user is leaning in a certain direction. Variable input control 105 may also be a steering control on a handle bar or on a handheld control device. In some embodiments, vehicle control unit 110 may distribute power amongst the two wheels in a way that forces the vehicle to turn, rather than just accommodate the vehicle to turn which may be done in the four motor design. For example, because a two-wheeled vehicle with a side-to-side wheel configuration generally doesn't allow the wheels themselves to be angled with respect to the vehicle chassis, and that user leaning has little effect on naturally steering the vehicle, the only way to implement a turn is forcing one the wheels to rotate faster than the other wheel. Vehicle control unit 110 may first determine the angle that the user desires to turn given the signals received from variable input control 105. Second, vehicle control unit 110 may distribute power disproportionately between the left motor and the right motor. When the user indicates (through variable input control 105) that the desired steering angle is zero, vehicle control unit 110 may equalize the powers being distributed to each motor. The equalized power may be set to the average of the powers that were being distributed during the turn, the root-mean-square value of the powers that were being distributed during the turn, or some other calculation.

In some embodiments, the number of electric motors, axles, and wheels may be equal to a number much greater than four (N>>4). For example, buses, semi-trucks, and trains may implement the system of FIG. 1. For trains, vehicle control unit 110 may distribute power to motors on the same side of the train in equal amounts, even on turns. Unlike four-wheeled cars, vehicles that travel on tracks have less variation between the speeds of wheels on the same side due to the inability for rear wheels to take turns more sharply than front wheels. Thus, in some embodiments, vehicle control unit 110 may calculate the distributed power to be the same among motors on the same side of the train.

Figure 2:
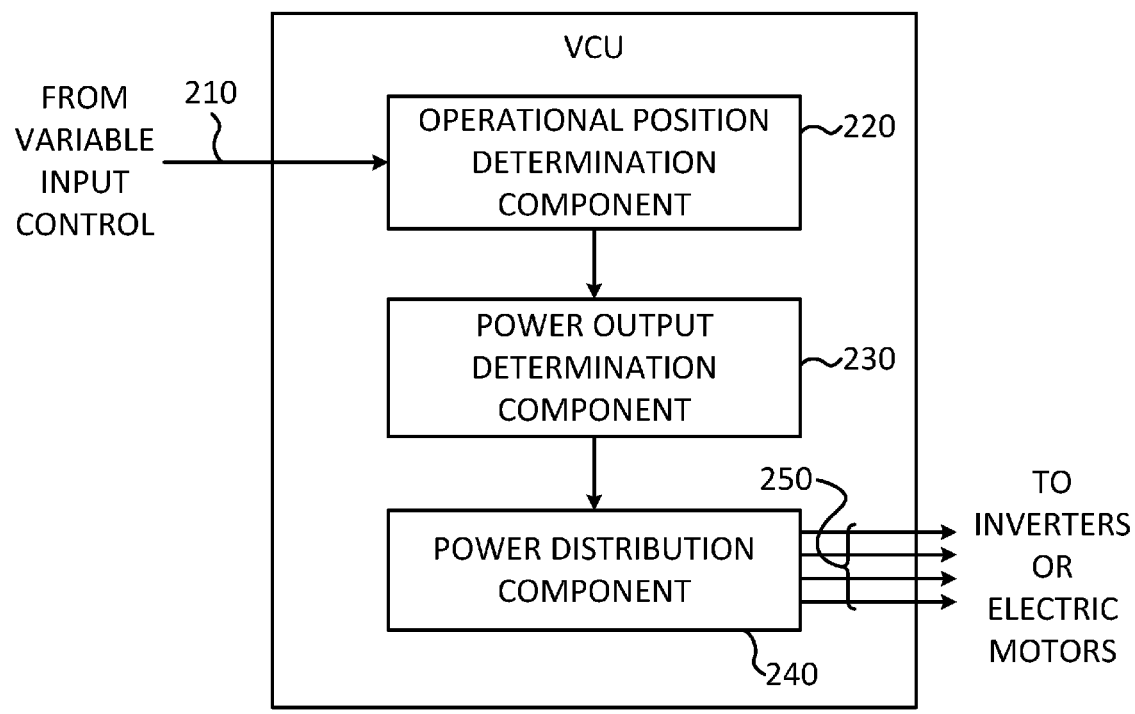
FIG. 2 shows a system diagram of an exemplary embodiment of a vehicle control unit.

FIG. 2 shows an exemplary embodiment of a vehicle control unit 200. In some embodiments, vehicle control unit 200 comprises three main components. First, an operational position determination component 220 receives a signal 210 from the variable input control. Second, a power output determination component 230 makes a determination as to how much power to distribute to each electric motor. Third, a power distribution component 240 provides the means to transfer power signals 250 to the electric motors. In some embodiments, power signals 250 are sent to inverters prior to the electric motors if the electric motors require an AC electrical voltage rather than a DC electrical voltage. In some embodiments, power distribution component 240 provides power signals 250 in AC electrical voltage form, removing the need for inverters. In some embodiments, a vehicle battery may be located within power distribution component 240. In other embodiments, the battery may be located outside vehicle control unit 200, alongside each electric motor, or in a remote location in the vehicle.

In some embodiments, operational position determination component 220 receives signal 210 from the variable input control in terms of a voltage, either received wirelessly or through a wired connection. In some embodiments, signal 210 may be compared to a reference signal to determine the operational position of the variable input control. For example, assuming the reference signal of 1 volt corresponds to the accelerator pedal being "100% pressed", if signal 210 is received at 0.75 volts, operational position determination component 220 may determine that the operational position of the variable input control is "75% pressed". As another example, assuming the reference signal of 5 volts corresponds to the steering wheel being turned 180 degrees to the right, if signal 210 is received at 2.5 volts, operational position determination component 220 may determine that the operational position of the variable input control is that the steering wheel is turned 90 degrees to the right. It should be noted that the mapping of signal 210 into an operational position need not be linear as the previous examples have shown. For example, a signal 210 of 1 volt may correspond to the brake pedal being "10% pressed" and a signal 210 of 2 volts may correspond to the brake pedal being "50% pressed". Operational position determination component 220 may use a lookup table to perform the mapping, or it may use a formulaic approach. For example, the operational position may be determined using an equation similar to the following: operational position=2×(signal 210−3 volts).

In some embodiments, operational position determination component 420 may, instead of solely receiving a signal magnitude, receive a desired vehicle speed or a desired turning angle from the variable input control. For example, a user may specify through a keypad or other interface that the desired vehicle speed is 30 mph. In some embodiments, operational position determination component 420 may receive signal 410 that is then determined to correspond to 30 mph either using a lookup table or using a formulaic approach.

Figure 3:
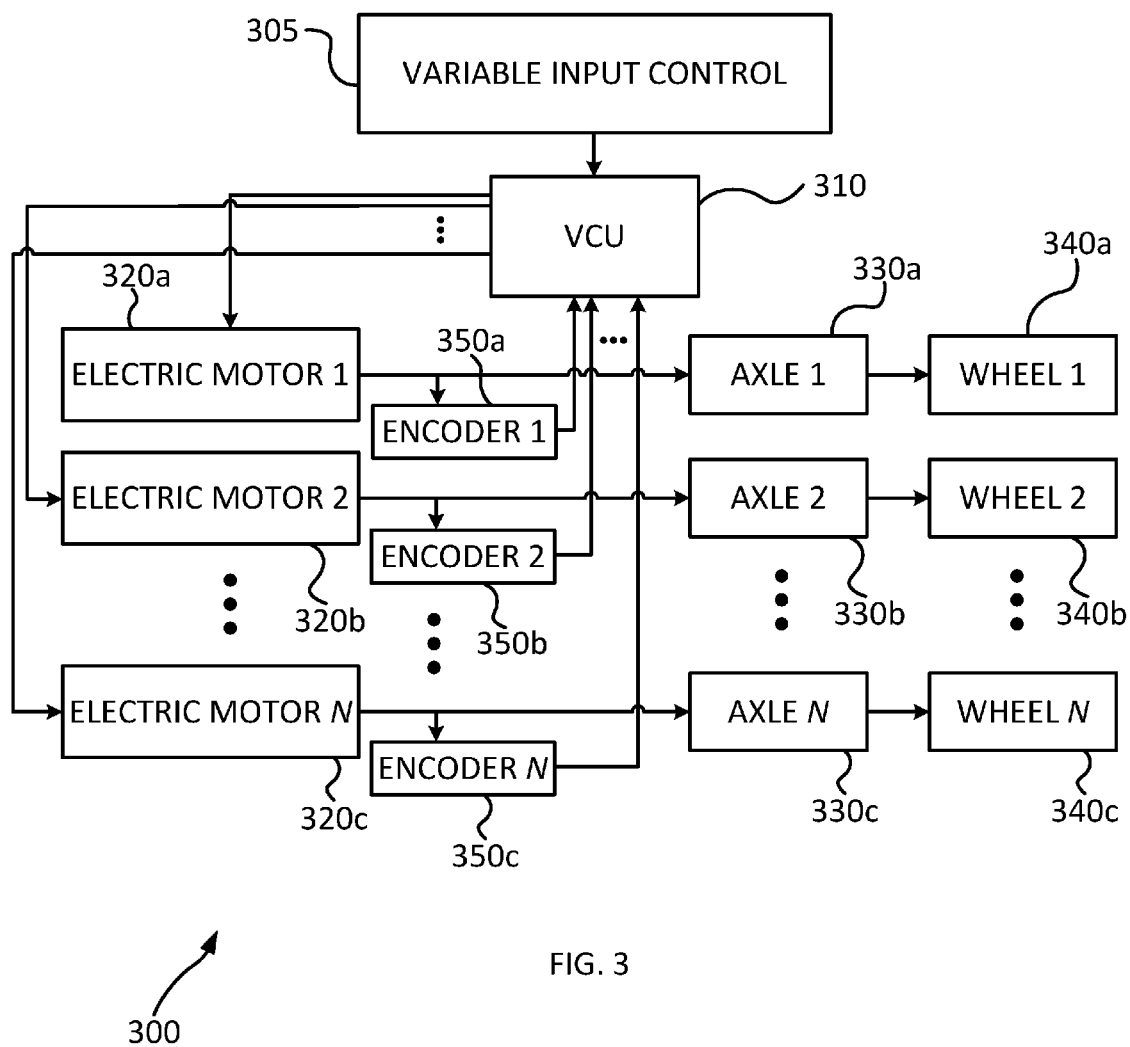
FIG. 3 shows a system diagram of an exemplary embodiment of a driving system with encoders.

FIG. 3 shows an exemplary embodiment of a driving system 300. Driving system 300 comprises variable input control 305, vehicle control unit 310, electric motors 320, axles 330, wheels 340, and encoders 350. In some embodiments, encoders 350 are placed near electric motors 320 to record their mechanical output. Encoders 350 may be placed as sensors inside electric motors 320, on the surface of electric motors 320, or at some other location near axles 330 or wheels 340. In some embodiments, encoders 350 detect the rotational speeds of electric motors 320. Rotational speed may also be detected on axles 330 or wheels 340, and should yield the same value at either location as angular velocity is not a function of the radius of the rotating object. In some embodiments, encoders 350 may detect the tangential speeds of wheels 340. This could either be done by detecting the speed of the outside of the wheels or by detecting rotational speed and computing tangential speed using the wheel's radius. The information gathered by encoders 350 may then be transmitted, either wirelessly or through a wired connection, to vehicle control unit 310.

Figure 4:
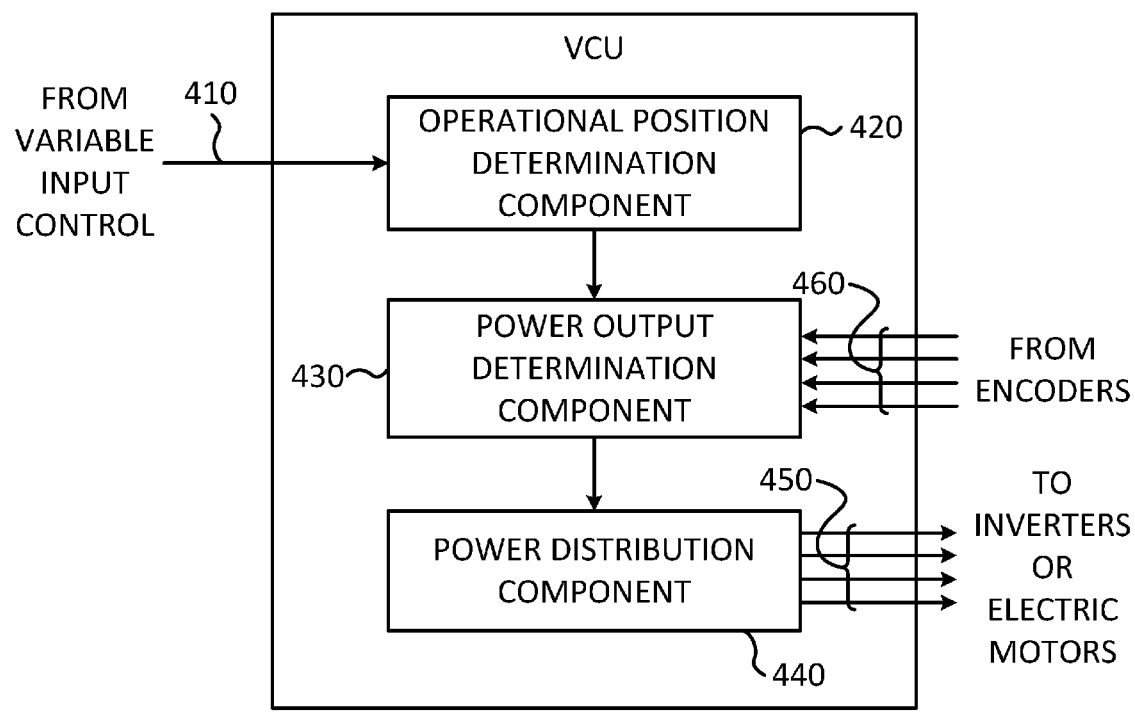
FIG. 4 shows a system diagram of an exemplary embodiment of a vehicle control unit with encoders.

FIG. 4 shows an exemplary embodiment of a vehicle control unit 400. Vehicle control unit 400 comprises operational position determination component 420 which receives a signal 410 from the variable input control, power output determination component 430, and power distribution component 440 which provides the means to transfer power signals 450 to the electric motors. In some embodiments, vehicle control unit 400 receives feedback signals 460 from various encoders which detect the mechanical output of the electric motors. Power output determination component 430 may use feedback signals 460 to error correct if certain electric motors are not performing in an expected way.

Additionally, feedback signals 460 permit power output determination component 430 to accurately maintain a desired vehicle speed. For example, as discussed earlier, in some embodiments the variable input control may provide vehicle control unit 400 with a desired vehicle speed, e.g., 30 mph. Power output determination component 430 may, as a first iteration, determine power levels to drive the vehicle at a speed of approximately 30 mph using the specification sheets from the manufacturers of the electric motors. Feedback signals 460 from the encoders will then allow power output determination component 430 to adjust power signals 450 if there is a difference between the desired vehicle speed and the actual vehicle speed, i.e., an error. For example, if feedback signals 460 report that the actual vehicle speed is greater than the desired vehicle speed, power output determination component 430 may lower power signals 450 accordingly. Conversely, if feedback signals 460 report that the actual vehicle speed is less than the desired vehicle speed, power output determination component 430 may increase power signals 450 accordingly.

Another example of a computation vehicle control unit 400 might perform is varying the voltage levels delivered to different electric motors based on whether the vehicle is turning. If a sharp right turn is being performed, vehicle control unit 400 may modify power signals 450 to deliver twice as much power to left-side electric motors than is delivered to right-side electric motors to compensate for the increased distance left-side wheels must travel compared to right-side wheels. Another example of a computation vehicle control unit 400 might perform is to decrease the power/voltage levels delivered to the electric motors when the brake pedal is pressed by the user. Depending on how much the brake pedal is pressed, it may be more efficient for the vehicle to bypass the braking system and instead only decrease power signals 450 which are delivered to the electric motors.

Figure 5:
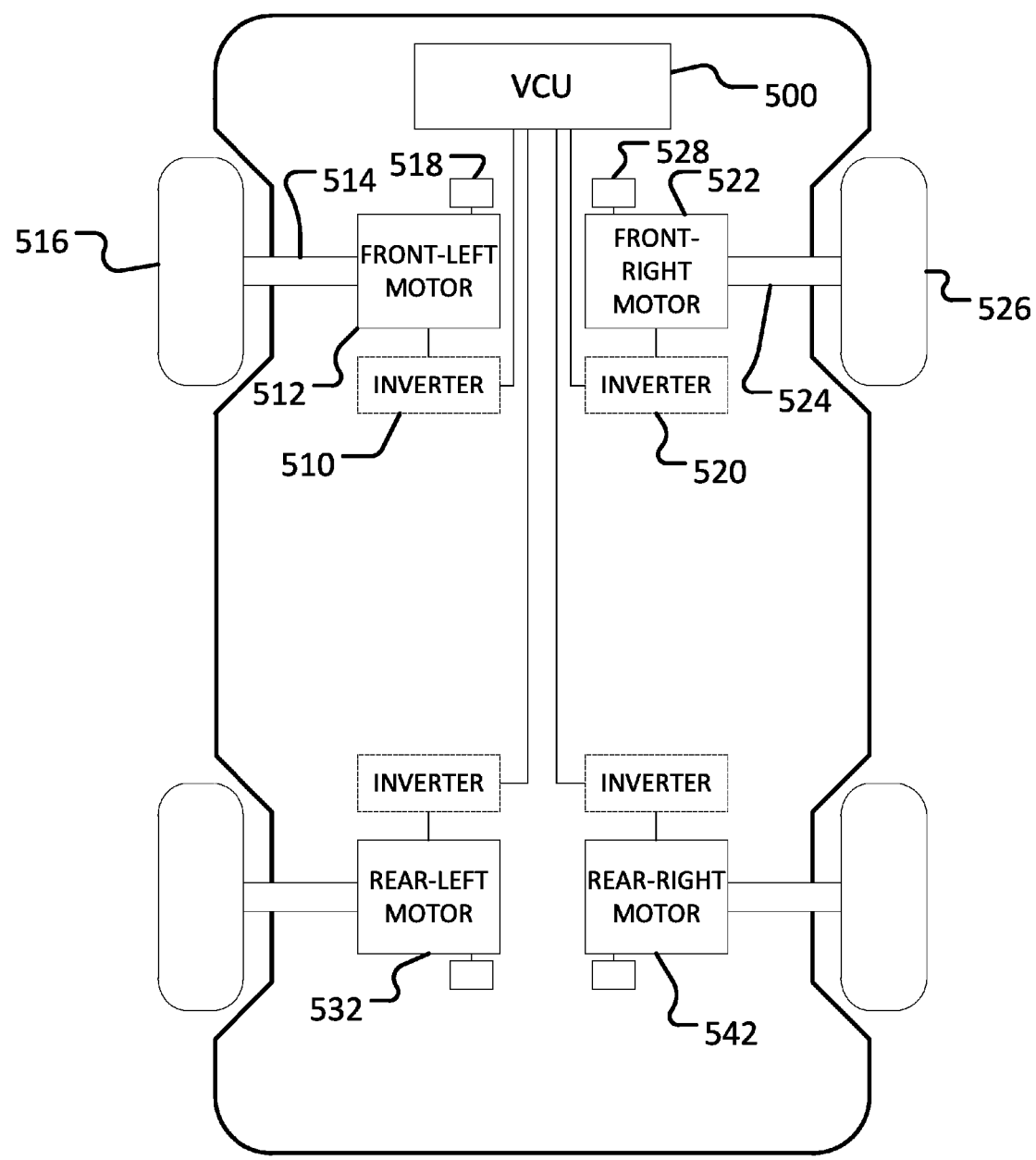
FIG. 5 shows a top view of the four motor direct driving system, according to an exemplary embodiment of the present disclosure.

FIG. 5 shows a top view of a four motor direct driving system according to an exemplary embodiment of the present disclosure. In some embodiments, the four electric motors are placed within the vehicle chassis and away from the wheels. Front-left motor 512 may be positioned in the forward and left portion of the vehicle and connected to front-left wheel 516 by means of front-left axle 514. Similarly, front-right motor 522 may be positioned in the forward and right portion of the vehicle and connected to front-right wheel 526 by means of front-right axle 524. Because front-left axle 514 and front-right axle 524 are unattached and independent from each other, the electric motors driving them may also operate independently and at different angular velocities. Rear-left motor 532 and rear-right motor 542 operate similarly to the front motors.

In some embodiments, encoder 518 may be connected to front-left motor 512 and encoder 528 to front-right motor 522. Encoders 518 and 528 report mechanical outputs to vehicle control unit 500, which controls the voltage inputs of the electric motors. As discussed previously, in some embodiments vehicle control unit 500 makes the determination as to how much power to distribute to different electric motors based on information from the encoders, the encoders thus behaving as feedback loops. For example, in a scenario where the vehicle is running on an uneven surface, if vehicle control unit 500 is delivering 10 volts to both front-left motor 512 and front-right motor 522, and encoders 518 and 528 are reporting that front-right motor 522 is rotating more slowly than front-left motor 512, then vehicle control unit 500 may increase the voltage delivered to front-right motor 522 to compensate for this difference to stabilize the vehicle.

In some embodiments, before electrical power is delivered to the electric motors, it is first passed through a series of inverters. Inverters generally transform a DC electrical signal into an AC electrical signal. Depending on the type of electric motors used, the inverters may or may not be necessary. For example, a DC brushed motor would not require an inverter to operate as it functions with DC electricity. On the other hand, induction motors require an AC signal and thus inverters would be needed. AC and DC electric motors have speed/torque tradeoffs that will influence the decision as to which one may be more appropriate for the type of vehicle that is employing the design. The optional nature of the inverters are denoted in FIG. 5 with dashed lines. Inverter 510 receives a voltage signal from vehicle control unit 500 and outputs it to front-left motor 512. Similarly, inverter 520 receives a voltage signal and outputs it to front-right motor 522.

Figure 6:
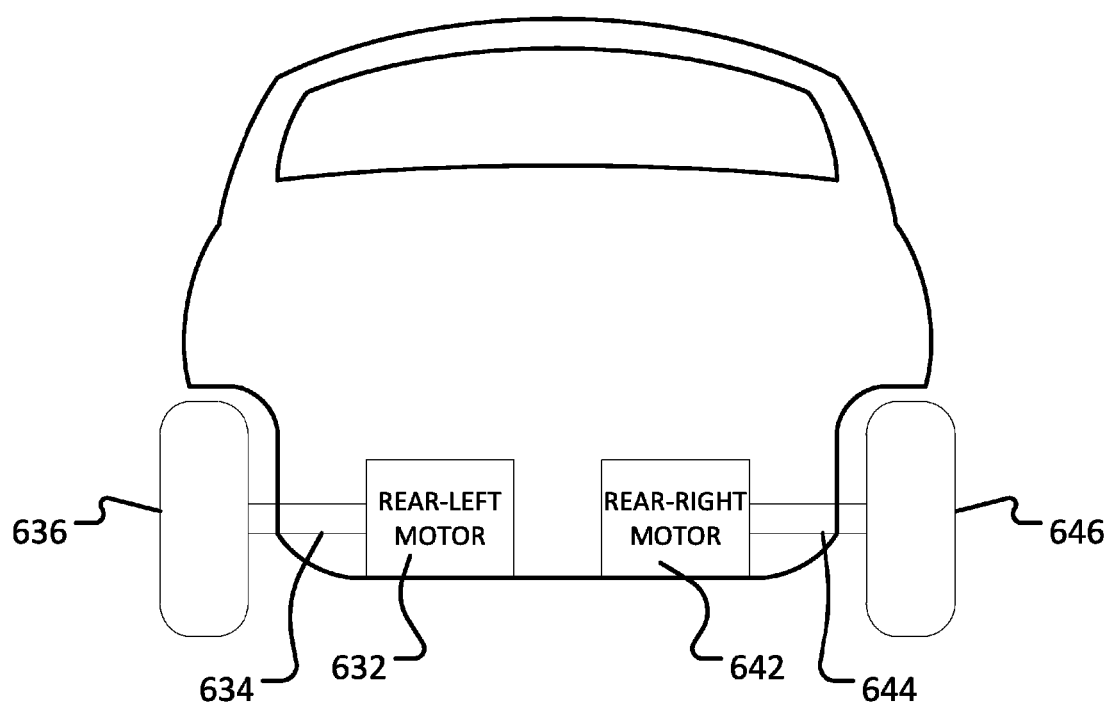
FIG. 6 shows a rear view of the four motor direct driving system, according to an exemplary embodiment of the present disclosure.

FIG. 6 shows a rear view of an exemplary embodiment of the present disclosure in which rear-left motor 632 and rear-right motor 642 are secured to the chassis of a vehicle. In this embodiment, the rear motors are positioned horizontally in line with rear-left wheel 636, rear-left axle 634, rear-right axle 644, and rear-right wheel 646.

Figure 7:
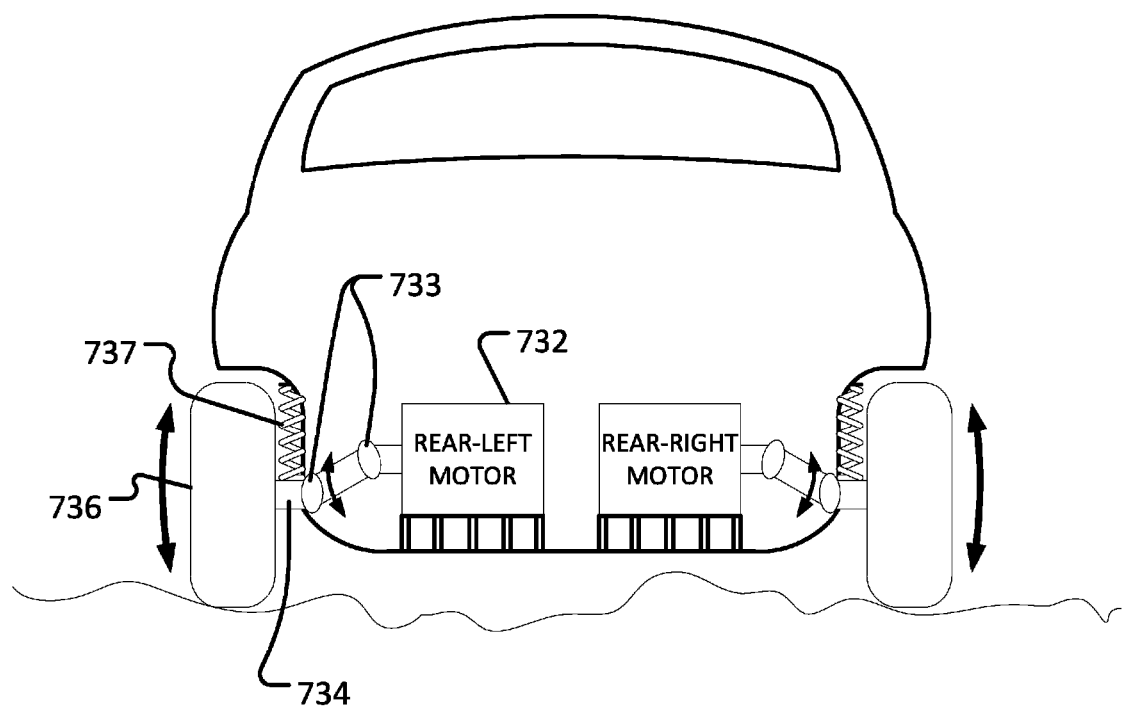
FIG. 7 shows a rear view of the four motor direct driving system that utilizes constant-velocity joints, according to an exemplary embodiment of the present disclosure.

FIG. 7 shows a rear view of an exemplary embodiment of the present disclosure in which rear-left motor 732 is secured to the chassis of a vehicle and constant-velocity joints 733 are positioned to allow rear-left axle 737 to properly rotate rear-right wheel 736. FIG. 7 demonstrates how a four motor direct driving system can be employed in conjunction with a suspension system. Shock absorber 737 is secured on one end to the chassis of the vehicle and on the other end to rear-left axle 734. In some embodiments, constant-velocity joints enable the electric motors to deliver rotational power to the wheels with little loss due to friction and heat. In this manner, the electric motors remain secured to the chassis of the vehicle and do not become part of the unsprung mass.

Figure 8:
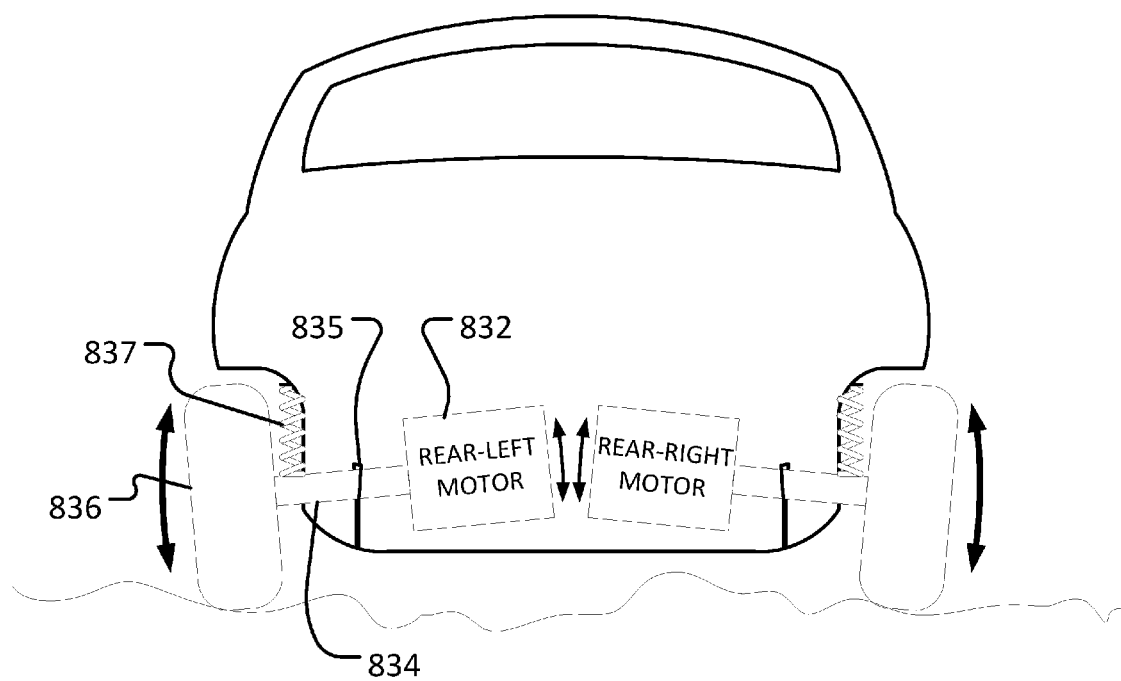
FIG. 8 shows a rear view of the four motor direct driving system that utilizes a pivot system.

FIG. 8 shows a rear view of an exemplary embodiment of the present disclosure in which a pivot system is employed in conjunction with a suspension system. In some embodiments, rear-left motor 832 is linearly connected with rear-left axle 834 and rear-left wheel 836, and rear-left axle 834 is secured to shock absorber 837 and is able to pivot on pivot 835. Such a system permits high power transfer between the motors and the wheels with little friction losses that arise from constant-velocity joints. Disadvantages of the pivot system are the additional amount of unsprung mass and the decreased compactness of the design.

Figure 9:
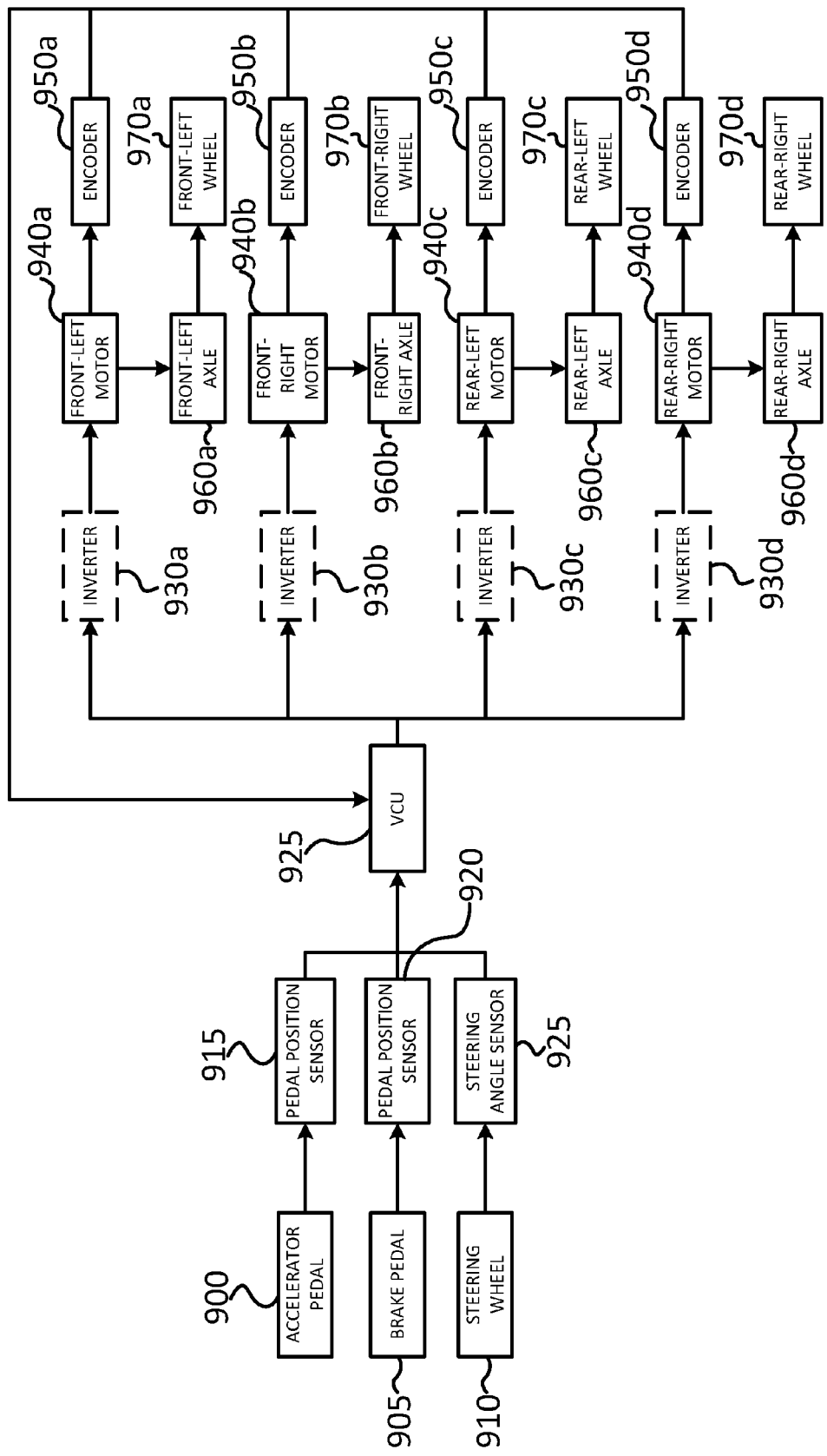
FIG. 9 shows a system diagram of the four motor direct driving system that demonstrates how the various components interact.

FIG. 9 is an exemplary embodiment of a system diagram of various components in a driving system in accordance with one embodiment of the disclosure. In this example, vehicle control unit 925 receives signals from accelerator pedal 900 via pedal position sensor 915, from brake pedal 905 via pedal position sensor 920, and from steering wheel 910 via steering angle sensor 925. Vehicle control unit 925 also receives signals from the four encoders 950 which give information about the mechanical outputs of the four electric motors 940. Vehicle control unit 925 processes the information derived from the sensors and encoders 950 and makes a determination as to how much voltage needs to be distributed to the four inverters 930. If DC motors are being employed, then the voltage is sent directly to the electric motors 940. The four electric motors 940 each provide rotational power to each of their respective axles 960 which are connected to wheels 970.

Figure 10:
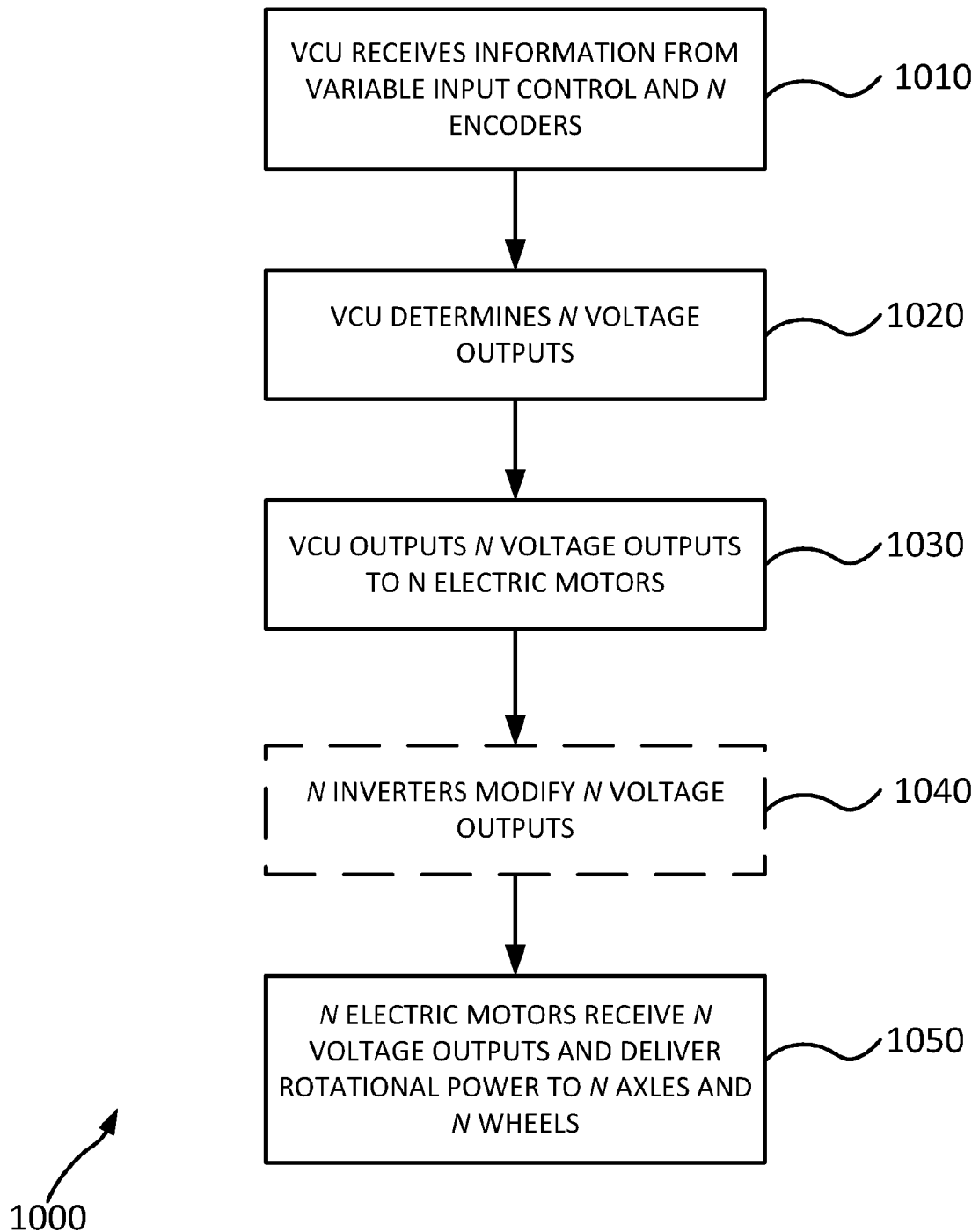
FIG. 10 shows a flow diagram of a method of driving a vehicle according to an exemplary embodiment of the present disclosure.

FIG. 10 illustrates an embodiment of a method 1000 for driving a vehicle. Method 1000 may be performed using any of the systems or components previously described. In some embodiments, the method may include a vehicle control unit receiving information from a variable input control and N encoders at operation 1010. The vehicle control unit need not receive information from both the variable input control and the N encoders. It may receive information from the variable input control alone, from only the N encoders, or from a number of encoders less than N. The method may also include the vehicle control unit determining N voltage outputs at operation 1020, and distributing the N voltage outputs to N electric motors at operation 1030. The method may also include the optional step of N inverters modifying the N voltage outputs at operation 1040, prior to passing the signals to the N electric motors. The method may also include N electric motors receiving the N voltage outputs and delivering rotational power to N axles and N wheels at operation 1050.

Figure 11:
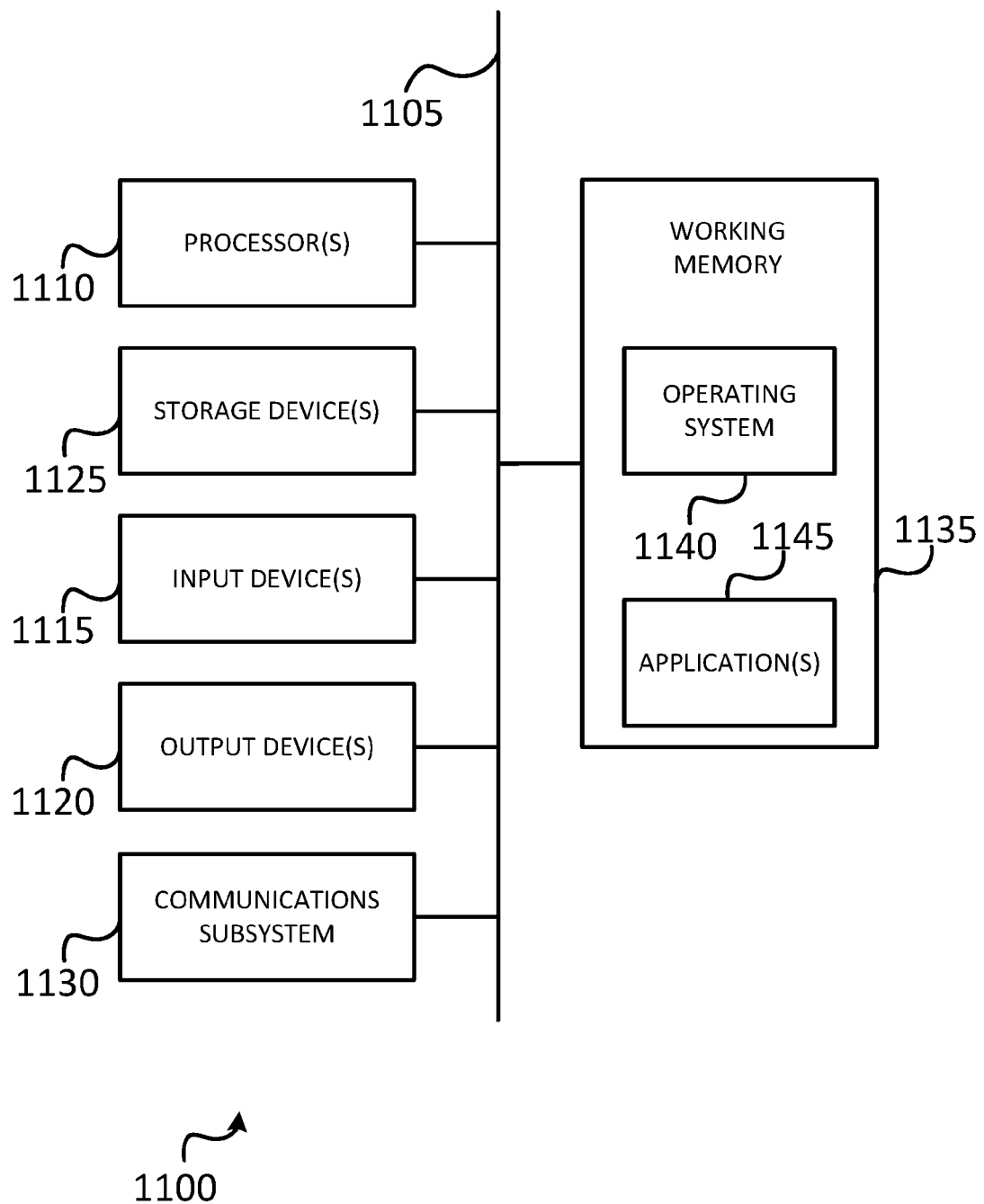
FIG. 11 shows a simplified computer system that may be utilized to perform one or more of the operations discussed.

FIG. 11 illustrates an embodiment of a computer system 1100. A computer system 1100 as illustrated in FIG. 11 may be incorporated into devices such as a portable electronic device, mobile phone, or other device as described herein. FIG. 11 provides a schematic illustration of one embodiment of a computer system 1100 that can perform some or all of the steps of the methods provided by various embodiments. It should be noted that FIG. 11 is meant only to provide a generalized illustration of various components, any or all of which may be utilized as appropriate. FIG. 11, therefore, broadly illustrates how individual system elements may be implemented in a relatively separated or relatively more integrated manner.

The computer system 1100 is shown comprising hardware elements that can be electrically coupled via a bus 1105, or may otherwise be in communication, as appropriate. The hardware elements may include one or more processors 1110, including without limitation one or more general-purpose processors and/or one or more special-purpose processors such as digital signal processing chips, graphics acceleration processors, and/or the like; one or more input devices 1115, which can include without limitation a mouse, a keyboard, a camera, and/or the like; and one or more output devices 1120, which can include without limitation a display device, a printer, and/or the like.

The computer system 1100 may further include and/or be in communication with one or more non-transitory storage devices 1125, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 1100 might also include a communications subsystem 1130, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 1130 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 1130. In other embodiments, a portable electronic device, e.g. the first electronic device, may be incorporated into the computer system 1100, e.g., an electronic device as an input device 1115. In some embodiments, the computer system 1100 will further comprise a working memory 1135, which can include a RAM or ROM device, as described above.

The computer system 1100 also can include software elements, shown as being currently located within the working memory 1135, including an operating system 1140, device drivers, executable libraries, and/or other code, such as one or more application programs 1145, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 10, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code might be stored on a non-transitory computer-readable storage medium, such as the storage device(s) 1125 described above. In some cases, the storage medium might be incorporated within a computer system, such as computer system 1100. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 1100 and/or might take the form of source and/or installable code, which, upon compilation and/or installation on the computer system 1100 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 1100 to perform methods in accordance with various embodiments of the technology. According to a set of embodiments, some or all of the procedures of such methods are performed by the computer system 1100 in response to processor 1110 executing one or more sequences of one or more instructions, which might be incorporated into the operating system 1140 and/or other code, such as an application program 1145, contained in the working memory 1135. Such instructions may be read into the working memory 1135 from another computer-readable medium, such as one or more of the storage device(s) 1125. Merely by way of example, execution of the sequences of instructions contained in the working memory 1135 might cause the processor(s) 1110 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 1100, various computer-readable media might be involved in providing instructions/code to processor(s) 1110 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1125. Volatile media include, without limitation, dynamic memory, such as the working memory 1135.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1100.

The communications subsystem 1130 and/or components thereof generally will receive signals, and the bus 1105 then might carry the signals and/or the data, instructions, etc. carried by the signals to the working memory 1135, from which the processor(s) 1110 retrieves and executes the instructions. The instructions received by the working memory 1135 may optionally be stored on a non-transitory storage device 1125 either before or after execution by the processor(s) 1110.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A vehicle driving system for an electric vehicle, the vehicle driving system comprising:
    an accelerator pedal with a corresponding accelerator pedal position;
    a steering wheel with a corresponding steering angle;
    two or more electric motors, wherein each of the two or more electric motors has a voltage input;
    a variable input control configured to provide a signal indicating an operational position of the variable input control, wherein the operational position of the variable input control is related to the accelerator pedal position and the steering angle;

two or more wheels, wherein each of the two or more wheels are connected to one of the two or more electric motors by an axle; and a vehicle control unit configured to control the voltage inputs of the two or more electric motors by accessing a two-dimensional lookup table containing a plurality of voltage ratios between the two or more electric motors, the lookup table having a first input being the accelerator pedal position corresponding to a first dimension of the lookup table, and a second input being the steering angle corresponding to a second dimension of the lookup table, wherein the vehicle control unit is further configured to:

receive information indicating the operational position of the variable input control;

identify, within the lookup table, a voltage ratio of the plurality of voltage ratios based on the accelerator pedal position and the steering angle;

determine the voltage inputs for the two or more electric motors based on the voltage ratio such that, when the electric vehicle is turning, a first voltage input for a first electric motor coupled with an inside turning wheel is less than a second voltage input for a second electric motor coupled with an outside turning wheel, the inside turning wheel being on the same side of the electric vehicle as the direction the electric vehicle is turning and the outside turning wheel being on the opposite side of the electric vehicle as the direction the electric vehicle is turning, wherein the corresponding voltage ratio is a ratio between the first voltage input and the second voltage input; and generate instructions to effectuate the voltage inputs to the two or more electric motors.

2. The system of claim 1, further comprising:
two or more electric power inverting devices that invert voltage, wherein each of the two or more electric power inverting devices are configured to receive an input from the vehicle control unit and output a voltage to one of the two or more electric motors.

3. The system of claim 2, further comprising:
two or more encoders, wherein each of the two or more encoders are configured to record a mechanical output from one of the two or more electric motors.

4. The system of claim 3, wherein each of the two or more encoders contain an output that feeds back to the vehicle control unit.

5. The system of claim 4, wherein there are four electric motors, four wheels, four electric power inverting devices, and four encoders.

6. The system of claim 5, further comprising:
a brake pedal with a corresponding brake pedal position.

7. The system of claim 6, wherein the operational position of the variable input control is related to the brake pedal position.

8. The system of claim 7, wherein the vehicle control unit is configured to control the voltage inputs of the four electric motors based on signals received from the accelerator pedal, the brake pedal, the steering wheel, and the four encoders.

9. The system of claim 7, wherein the mechanical output recorded by the four encoders from the four electric motors is the rotational speed of each motor.

10. The system of claim 7, wherein the mechanical output recorded by the four encoders from the four electric motors is the tangential speed of each wheel.

11. The system of claim 1, wherein each of the two or more wheels are connected to one of the two or more electric motors without the use of transmission gears.

12. The system of claim 1, wherein the two or more electric motors comprise a left-rear motor attached to a left-rear wheel and a right-rear motor attached to a right-rear wheel.

13. The system of claim 1, wherein each of the two or more electric motors are separate and distinct from each of the two or more wheels.

14. A vehicle driving system for an electric vehicle, the vehicle driving system comprising:

an accelerator pedal with a corresponding accelerator pedal position;

a brake pedal with a corresponding brake pedal position;

a steering wheel with a corresponding steering angle;

two or more electric motors, wherein each of the two or more electric motors has a voltage input;

a variable input control configured to provide a signal indicating an operational position of the variable input control, wherein the operational position of the variable input control is related to the accelerator pedal position, the brake pedal position, and the steering angle;

two or more wheels, wherein each of the two or more wheels are connected to one of the two or more electric motors by an axle;

a vehicle control unit configured to control the voltage inputs of the two or more electric motors by accessing a two-dimensional lookup table containing a plurality of voltage ratios between the two or more electric motors, the lookup table having a first input being the accelerator pedal position corresponding to a first dimension of the lookup table, and a second input being the steering angle corresponding to a second dimension of the lookup table, wherein the vehicle control unit is further configured to:

receive information indicating the operational position of the variable input control;

identify, within the lookup table, a voltage ratio of the plurality of voltage ratios based on the accelerator pedal position and the steering angle;

determine the voltage inputs for the two or more electric motors based on the brake pedal position and the voltage ratio such that, when the electric vehicle is turning, a first voltage input for a first electric motor coupled with an inside turning wheel is less than a second voltage input for a second electric motor coupled with an outside turning wheel, the inside turning wheel being on the same side of the electric vehicle as the direction the electric vehicle is turning and the outside turning wheel being on the opposite side of the electric vehicle as the direction the electric vehicle is turning, wherein the corresponding voltage ratio is a ratio between the first voltage input and the second voltage input; and generate instructions to effectuate the voltage inputs to the two or more electric motors;

two or more electric power inverting devices that invert voltage, wherein each of the two or more electric power inverting devices are configured to receive an input from the vehicle control unit and output a voltage to one of the two or more electric motors;

two or more encoders, wherein each of the two or more encoders are configured to record a mechanical output from one of the two or more electric motors;

wherein the vehicle control unit is configured to control the voltage inputs of the two or more electric motors based on signals received from the accelerator pedal, the brake pedal, the steering wheel, and the two or more encoders;

wherein the mechanical output recorded by the two or more encoders from the two or more electric motors is the rotational speed of each motor; and wherein each of the two or more electric motors are separate and distinct from each of the two or more wheels.

15. A method for driving an electric vehicle, the method comprising:

receiving a signal at a vehicle control unit from a variable input control, wherein the signal from the variable input control corresponds to an operational position of the variable input control, and wherein the operational position of the variable input control is related to an accelerator pedal position corresponding to an accelerator pedal and a steering angle corresponding to a steering wheel;

accessing a two-dimensional lookup table containing a plurality of voltage ratios between the two or more electric motors, the lookup table having a first input being the accelerator pedal position corresponding to a first dimension of the lookup table, and a second input being the steering angle corresponding to a second dimension of the lookup table;

identifying, within the lookup table, a voltage ratio of the plurality of voltage ratios based on the accelerator pedal position and the steering angle;

determining a first and second voltage output at the vehicle control unit based on the voltage ratio such that, when the electric vehicle is turning, a first voltage input for a first electric motor coupled with an inside turning wheel is less than a second voltage input for a second electric motor coupled with an outside turning wheel, the inside turning wheel being on the same side of the electric vehicle as the direction the electric vehicle is turning and the outside turning wheel being on the opposite side of the electric vehicle as the direction the electric vehicle is turning, wherein the corresponding voltage ratio is a ratio between the first voltage input and the second voltage input;

outputting the first voltage output at the vehicle control unit toward the first voltage input of the first electric motor;

outputting the second voltage output at the vehicle control unit toward the second voltage input of the second electric motor; and wherein the first and second electric motor are connected to a first and second wheel by a first and second axle, respectively.

16. The method of claim 15, further comprising:

passing the first voltage output through a first electric power inverting device prior to the first voltage input of the first electric motor; and passing the second voltage output through a second electric power inverting device prior to the second voltage input of the second electric motor.

17. The method of claim 16, further comprising:

receiving a signal at the vehicle control unit from a first encoder;

receiving a signal at the vehicle control unit from a second encoder; and wherein the signals from the first and second encoder represent a mechanical output from the first and second electric motor, respectively.

18. The method of claim 17, wherein the determining of the first and second voltage output at the vehicle control unit is based on the information received from the variable input control and the information received from the first and second encoder.

* * * * *